US005128188A

United States Patent [19]

Olson

[11] Patent Number: 5,128,188

[45] Date of Patent: Jul. 7, 1992

[54] FORMS SPLICER

[75] Inventor: Heidi S. Olson, Barrington, Ill.

[73] Assignee: HICO Products, Inc., Barrington, Ill.

[21] Appl. No.: 593,036

[22] Filed: Oct. 5, 1990

[51] Int. Cl.[5] .......................... B32B 3/06; B32B 3/08; B32B 3/10

[52] U.S. Cl. ...................................... 428/43; 428/136; 428/137; 428/138; 428/211; 428/195; 428/343; 428/40

[58] Field of Search ................. 428/43, 137, 136, 343, 428/211, 195, 138; 156/157

[56] References Cited

U.S. PATENT DOCUMENTS 4,545,517 10/1985 Olson .................................... 226/92
4,759,484 7/1988 Richter .................................. 226/6

*Primary Examiner*—Alexander S. Thomas
*Attorney, Agent, or Firm*—Malin, Haley, McHale, DiMaggio & Crosby

[57] ABSTRACT

A Forms Splicer is disclosed for use in splicing continuous feed computer forms whose separation prevents their continuous feed into a tractor feed printing device. The Forms Splicer is a single sheet of rectangular flexible material having an alignment/fold line across the width thereof defining the sheet into equal halves. The Forms Splicer employs a series of line pin holes along each side edge of the Splicer with spacing relative equal to pin hole spacing of the forms to be spliced. The forms to be spliced are aligned by the alignment/fold line and a series of alignment tabs on the lower portion of the Splicer. The alignment tabs overlap an area of the trailing form to be spliced providing pin hole reinforcement and a means to suppress raised edges to prevent paper jamming. Pressure sensitive adhesive strips maintain the forms to be spliced in alignment.

10 Claims, 2 Drawing Sheets

FORMS SPLICER

BACKGROUND OF THE INVENTION

This invention relates generally to the use of continuous form paper, and, more particularly, to a means for splicing separated continuous form paper permitting reuse in tractor feed printing devices.

The computer and related technology industries have provided consumers with printing devices capable of printing speeds unheard of a decade earlier. Printing speeds for tractor feed dot matrix printers went from a previously consumer accepted rate of 100 characters per second (100 cps) to current printing rates exceeding 1,000 cps and custom printers double that speed. However, while printing devices reach faster print rates the type of paper used is substantially the same as the paper used on slower speed printers.

The adroitness of dot matrix printers to print at high speeds requires the paper to be fed continuously. In many situations a break in a continuous flow of paper cannot be tolerated. Continuous preprinted paper forms such as bank drafts, checks, sales agreements, invoices, purchase orders, and the like require continuity to maintain normal business operations. For example, a computer program capable of check printing & accounting requires a continuous feed of check forms in sequential order. If preprinted checks are accidentally separated before the printing process, the check splicing must be accomplished to maintain the accounting program's integrity.

This continuous computer paper, hereinafter referred to as "forms", is fed into the printer by use of a tractor mechanism employing pins that fit into pin holes placed along the border of the forms to be printed upon. Paper manufacturers design these forms to conform to conventional paper items, e.g. 8½"×11" sized paper, by providing perforations across the width of the forms that, when separated, assimilates the conventional finished product that consumers are familiar with.

Form manufacturers use perforations to allow ease of individual form separation. The workmanship of the perforation joint is critical for tractor rotation speed places a tremendous strain on the perforation. Continuous forms that are stored by folding the forms onto themselves, create weak areas which may separate before use. This premature separation, or even a partial separation, defeats the primary objective of continuous forms and high speed printing devices.

Currently, one method of rejoining separated forms is by taping the forms together. Use of tape may remedy the situation but tape is difficult to apply and usually results in a mismatch of critical tractor pin hole spacing or in failure to provide sufficient strength to the pin hole area. Unless forms are spliced correctly the forms will not feed correctly increasing the probability of paper jamming and printer damage. Another method for feeding separated forms are forms leaders, described in U.S. Pat. No. 4,545,517 issued Oct. 8, 1985 to Olson and U.S. Pat. No. 4,759,484 issued Jul. 26, 1984 to Richter, however, form leaders do not provide a means for continuous form feeding.

While efforts have been made toward resolving these problems, no satisfactory solution has heretofore been provided. My invention is specifically designed to overcome the aforementioned problems by means of a splice allowing form reuse. It is, therefore, to the effective resolution of these problems that the present invention is directed.

SUMMARY OF THE INVENTION

The principle object of the present invention is to provide a simple and reliable means which overcomes the difficulties previously mentioned when using continuous forms in a tractor feed printing device. In accordance with this invention, my Forms Splicer permits continuous form paper that has become separated along the horizontal perforation to be spliced with provisions made for proper pin hole alignment and reinforcement. The Forms Splicer, hereinafter referred to as the "Splicer", allows the form paper to regain its continuous form characteristics for use in its ordinary manner.

The Splicer is formed from a single sheet of rectangular flexible material with a plurality of pin holes on the side edges of the sheet which are spaced equal distance with a relative spacing equal to the relative spacing of the pin holes on the forms to be spliced. Width of the Splicer accommodates 9½" computer paper, although the Splicer provides a means for use on any width paper. The preferred length of the Splicer is 6 inches permitting sufficient contact with the forms to be spliced while lengths other than 6 inches may be used without defeating the object of my invention.

The Splicer is defined into an upper portion and a lower portion by an alignment/fold line functionally acting to align the last form to be spliced. A plurality of alignment tabs are formed from the lower portion which assist in aligning the first form, provide pin hole reinforcement and overlap the first form in critical areas to prevent printer jamming. Two strips of pressure sensitive adhesive tape maintain the spliced forms in alignment.

To use the Splicer, the adhesive is exposed and the last form, the form that will lead into the printing device first but is the last form in a series of continuous forms, is placed on the upper portion of the Splicer. The alignment/fold line provides a simplified visual alignment tool for the trailing edge of the last form. The primary objective is to align the last form's pin holes with the pin holes on the upper portion of the Splicer. Upon correct alignment the last form is pressed against the adhesive to maintain the alignment.

Next, the first form, first in a series of continuous forms that will now follow the aforementioned last form, is placed on top of the lower portion of the Splicer but beneath the alignment tabs. Upon correct pin hole alignment the first form is pressed against the adhesive to maintain the pin hole alignment. The spliced forms are now used in their usual and ordinary manner.

Larger forms may also be spliced by use of the Splicer. A perforation joint is formed through the middle of the Splicer an equal distance between the pin holes. By separating the Splicer at the perforation line, two smaller Splicers are formed of mirror image qualities. Each Splicer is then attached to the pin hole area of the larger forms to be spliced in accordance with the aforementioned description.

Accordingly, it is an object of the present invention to provide a simple and reliable means for splicing continuous forms together for use in tractor feed printing devices.

Yet another object of the present invention is to provide a universal form splicer capable of accommodating different size forms.

Still another object of the present invention is the use of alignment tabs to assist in alignment, provide pin hole reinforcement, and overlap the exposed form break to help prevent printer jamming.

Another object of the present invention is to provide a means of maintaining pin hole alignment by use of reusable adhesive.

Yet another object of the present invention is to provide a forms splicer from a single piece of paper that is inexpensive to manufacture and reusable.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

As required, detailed embodiments of the present invention are disclosed herein, however, it is to be understood that the disclosed embodiments are merely exemplary of the invention which may be embodied in various forms. Therefore, specific functional and structural details disclosed herein are not to be interpreted as limiting, but merely as a basis for the claims and as a representative basis for teaching one skilled in the art to variously employ the present invention in virtually any appropriately detailed structure.

Figure 1:
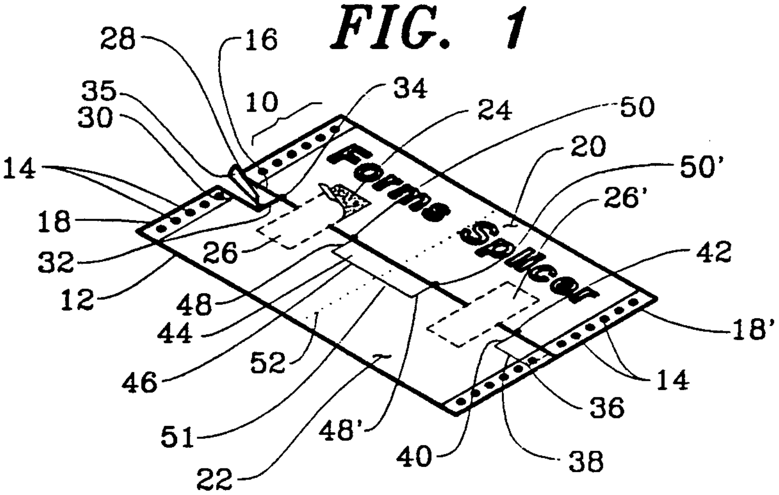
FIG. 1 is a perspective view showing the Forms Splicer of the present invention.

Referring to the drawings in more detail, FIG. 1 is my Forms Splicer 10, hereinafter referred to as the "Splicer", fabricated from a single sheet of flexible four edge rectangular material 12, preferably paper in the 16 to 28 pound (60 to 90 g/m$^2$) range. Width of the Splicer accommodates 9½ inch computer paper or, as described later in this description, is universal in design for use on any size form. The preferred length of the Splicer is 6 inches permitting sufficient contact area with the form to be spliced. Lengths other than 6 inches may be used without defeating the object of my invention.

The sheet 12 includes a plurality of pin holes 14 made by conventional hole punch techniques extending down the left side edge 18 of the sheet and the right side edge 18' of the sheet. Pin holes are spaced at intervals in accordance to printer manufacturers standards relative to pin hole spacing of computer forms to engage a standard tractor mechanism on printing devices. A horizontal alignment/fold line 16 across the width of the sheet 12 perpendicular to the side edges defines an upper portion 20 and a lower portion 22. Pressure sensitive adhesive 24 is formed across the surface of the sheet extending over an area of upper portion 20 and lower portion 22. Preferably, the adhesive 24 is a separately formed adhesive strip having adhesive on two sides, one side being of a high tack used to adhere the strip to the sheet 12 and the other of relatively low tack that will attach to the form to be spliced. To maintain the adhesion quality of the adhesive a paper strip 26 is placed over the adhesive when the adhesive is not in use.

A first side edge alignment tab 28 is formed from the lower portion 22 by cut line 30, parallel with alignment-/fold line 16, extending from the left side edge 18 inwardly for a length approximately one inch. A cut 32 is made perpendicular from the innermost edge of cut line 30 for approximately ½ inch to and through the alignment line 16 ending in a punched hole 34 in the upper portion 20. Circular design of punched hole 34 acts as a stress relief area to help prevent tearing of cut 32 and further provide an extension area to assist in form alignment. The first side edge alignment tab can be lifted at cut line 30 thereby exposing the bottom side of the tab 35 without lifting the sheet 22.

A second side edge alignment tab 36 is formed in mirror image to the first side edge alignment tab 28 by cut line 38, parallel with alignment line 16, extending from the right side edge 18' inwardly for a length approximating one inch. A cut 40 is made perpendicular from the innermost edge of cut line 38 for approximately ½ inch to and through the alignment/fold line 16 ending in a punched hole 42 in the upper portion 20. Circular design of punched hole 42 acts as a stress relief point to help prevent tearing of cut 40 and further provide an extension area to assist in form alignment. The second side edge alignment tab can be lifted at cut line 38 thereby exposing the bottom side of the tab 35' without lifting the sheet 22.

A center alignment tab 44 is formed from the lower portion 22 by cut line 46 which is parallel with alignment/fold line 16 for approximately two inches equidistant from side edges 18, 18'. Cuts 48 and 48' are made perpendicular from the outermost edge of cut line 46 for approximately ½ inch to and through the alignment line 16 ending in a punched hole 50 and 50' in upper portion 20. Circular design of punched hole 50, prevents tearing of cut 48, by acting as a stress relief hole and further provides an extension area to assist in form alignment. Circular design of punched hole 50' acts as a stress relief point to help prevent tearing of cut 48' and further provide an extension area to assist in form alignment. The center alignment tab can be lifted at cut line 46 thereby exposing the bottom side of the tab 51 without lifting the sheet 22. Perforation line 52 is formed across the sheet 12 equal distance between the side edges 18, 18'.

Figure 2:
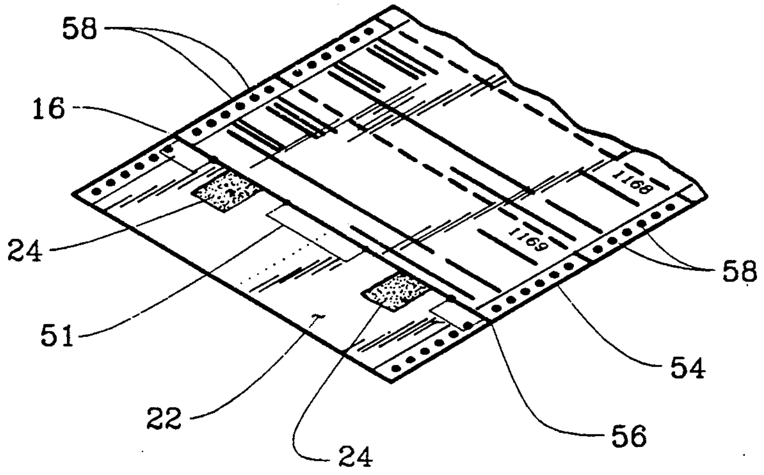
FIG. 2 is a perspective view showing the placement of a last form in the Forms Splicer.

Now referring to FIG. 2, the Splicer is utilized by removal of adhesive tape covers 26 exposing adhesive 24. The last business form 54 to be spliced, (last form in a series of continuous forms shown separated by sequential numbering), is positioned upon upper portion 20 of the Splicer 10 with trailing edge 56 visually aligned with alignment/fold line 16. Upon center of tractor pin holes 58 directly over corresponding pin holes 14 of the upper portion 20, the business form 54 is pressed against the adhesive 24 to maintain the pins holes in alignment.

Figure 3:
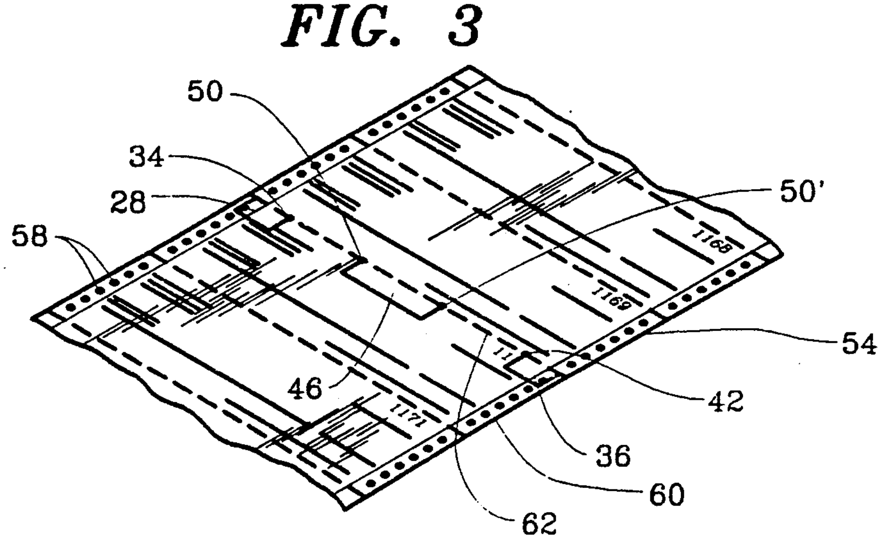
FIG. 3 is a perspective view showing the placement of a last from and first form in the Forms Splicer.

FIG. 3 shows business form 54 in position and a first business form 60, (first from in a series of continuous forms shown separated by sequential numbering) positioned upon the lower portion 20 by placing the leading edge 62 of the first business form 60 beneath the first side edge alignment tab 28. Hole punch 34 assists in form alignment with a tolerance area that permits the leading edge 62 to slide under the first side edge alignment tab against the bottom surface 35 and onto the upper portion 20 thereby assisting pin hole 58 alignment on the lower portion. Second side edge alignment tab 36, mirror image of first side edge alignment tab 28, operates in the same manner with punch hole 42 providing a tolerance for pin hole alignment. The leading edge 62 of the business form 60 is placed beneath the second side edge alignment tab 28 against the bottom side 35′ of the tab. Center alignment tab 46 anchors the middle of business form 60 against the lower portion 22 by placement of the leading edge 62 of the business form 60 against the bottom side 51 of the tab. Punch holes 50, 50′ provide a tolerance for form movement, if needed for pin hole alignment. Once the tractor pin holes are aligned on the lower portion, the business form 60 is pressed against the adhesive 24 to maintain the overlapping tractor pins holes in alignment.

Figure 4:
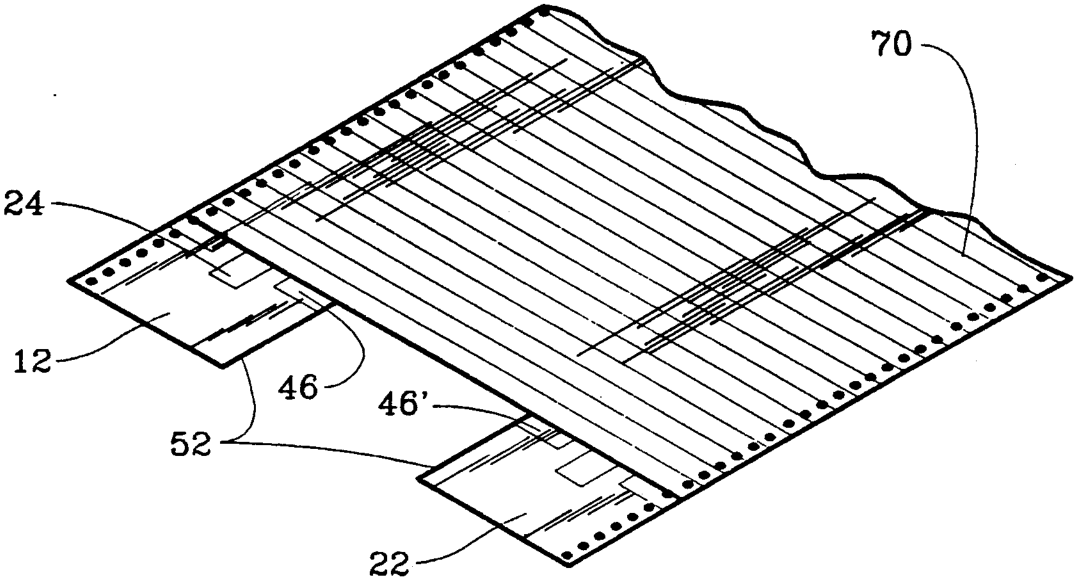
FIG. 4 is a fragmentary perspective view of a typical feed arrangement for a Forms Splicer in a tractor feed printing device.

Referring to FIG. 4 by way of example, the Splicer 10 is shown in position with the now spliced business forms. Unprinted business forms are pulled from a stack 62 by means of engaging pin holes 58 with a plurality of pins 62 of the tractor mechanism 64. To prevent paper jamming, the leading uncut portion of first side edge alignment tab 28 and second side edge alignment tab 36 cover the previously exposed edge of the first business form 60 providing an unbroken leading edge that feeds beneath printing device tractor covers 66 used in holding forms against the tractor mechanism 64. In a similar manner, the leading uncut portion of alignment tab 46 provides an unbroken leading edge to help prevent paper jamming against the printing head 68. Finally, adhesive 24 secures the space between the alignment tabs further lessening exposed edges that may cause a paper jam.

To reuse the Splicer 10, forms are removed from the sheet 12 by lifting the forms from adhesive 24. The adhesive cover 26 can be reapplied over the adhesive 24 to maintain tack for future applications.

Figure 5:
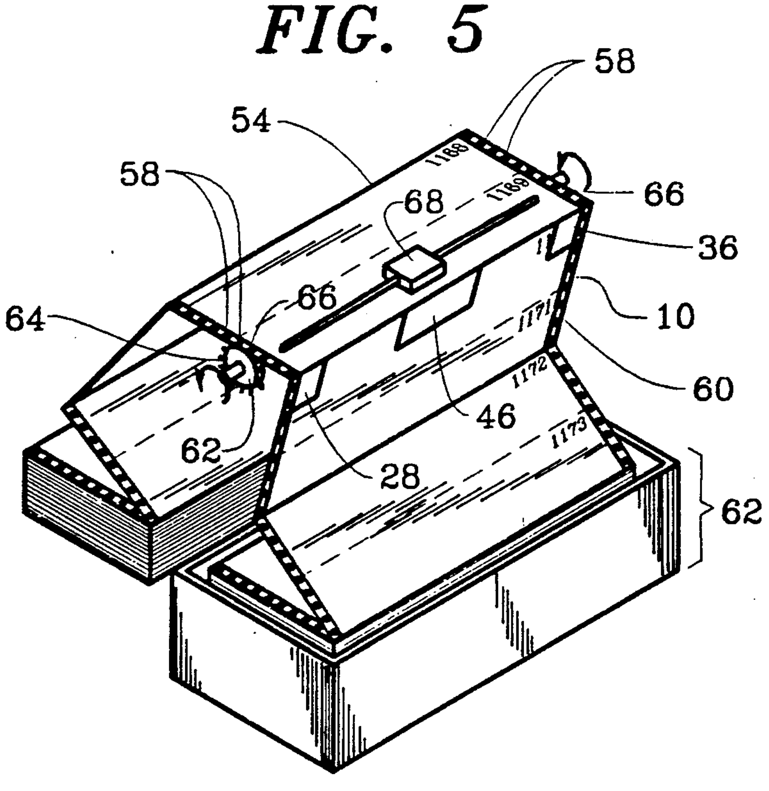
FIG. 5 is a perspective view showing the use of an oversize form with the Forms Splicer.

FIG. 5 demonstrates the use of the Splicer on an oversized business form 70 shown in position on the upper portion 20 of sheet 12. Means for using Splicer on larger forms requires the sheet 12 to be separated along the a perforation joint 52 across the middle of the sheet 12 equal distance from side edges 18, 18′, and when the sheet is separated at the perforation joint 52, creates two halves of mirror image. The Splicer is then attached to the oversize business form in the same fashion manner described above in FIGS. 2, 3 and 5 and used in its ordinary manner.

It is to be understood that while I have illustrated and described certain forms of my invention, it is not to be limited to the specific forms or arrangement of parts herein describe and shown. It will be apparent to those skilled in the art that various changes may be made without departing from the scope of the invention and the invention is not to be considered limited to what is shown in the drawings and described in the specification.

What I claim as new and desire to secure by Letters Patent of the United States is:

1. A forms splicer for splicing two forms of any size together for use on tractor feed printing devices employing a plurality of drive pins to engage a series of pin holes on each side edge of said two forms for feeding thereof, said forms splicer comprising:

a single sheet of flexible two surface material with four edges having a width equal to a width of forms to be spliced, formed therein a series of pin holes along two of said edges with spacing of pin holes relative equal to pin hole spacing of said forms;

an alignment/fold line formed across the width thereof defining said sheet into an upper portion and a lower portion, said alignment/fold line allowing visual alignment of said series of pin holes along two edges of the upper portion with pin holes of a first form of said two forms placed on the upper portion;

a plurality of alignment tabs with two surfaces on the lower portion of said sheet, said alignment tabs securing a second form of said two forms between a bottom surface of said alignment tab and a top surface of the lower portion assisting in alignment of said series of pin holes along two edges of the lower portion with pin holes of the second form placed on the lower portion;

a means for separating said sheet into equal halves for alignment of pin holes on any size form; and at least one pressure sensitive adhesive strip formed across the surface of the upper portion and the lower portion of said sheet for maintaining said pin holes of said two forms in alignment with said pin holes of said sheet.

2. A Forms Splicer as defined in claim 1, wherein said sheet material is paper.

3. A Forms Splicer as defined in claim 1, wherein one of said alignment tabs comprises a center alignment tab formed on the lower portion from two cuts of approximately ½ inch in length perpendicular to and through said alignment/fold line, said cuts approximately 2 inches apart connected by a third cut parallel to said alignment/fold line.

4. The center alignment tab according to claim 3 wherein said perpendicular cuts end in a punch hole.

5. A Forms Splicer as defined in claim 1, wherein two of said alignment tabs comprise a first side edge alignment tab and a second side edge alignment tab, said first side edge alignment tab formed from a first cut extending inwardly approximately one inch from a left side edge having a second cut made perpendicular from the innermost edge of the first cut approximately ½ inch to and through said alignment/fold line, said second side edge alignment tab formed from a first cut extending inwardly approximately one inch from a right side edge having a second cut made perpendicular from the innermost edge of the first cut for approximately ½ inch to and through said alignment/fold line.

6. The first and second alignment tab according to claim 5 wherein said perpendicular cuts end in a punch end.

7. A Forms Splicer as defined in claim 1, wherein said pressure sensitive adhesive strip is further defined as a first substantially continuous strip of adhesive disposed across the upper portion and the lower portion of said sheet, and a second substantially continuous strip of adhesive disposed across said upper portion and said lower portion of said sheet.

8. The pressure sensitive adhesive material as defined in claim 7 wherein said adhesive is a commercially available two-sided tape having high tack for application against said forms splicer and low tack for adhesion to said forms.

9. The Forms Splicer defined in claim 1 wherein said means for separating said sheet into equal halves comprising a perforation formed across said sheet equal distance between said side edges.

10. A forms splicer for splicing two forms of any size together for use on tractor feed printing devices employing a plurality of drive pins to engage a series of pin holes on each side edge of said two forms for feeding thereof, said forms splicer comprising:

a single sheet of rectangular flexible two surface material with four edges having a width equal to a width of forms to be spiced, formed therein a series of pin holes along two of said edges with spacing of pin holes relative equal to pin hole spacing of said forms;

an alignment/fold line formed across the width thereof defining said sheet into an upper portion and a lower portion, said alignment/fold line allowing visual alignment of said series of pin holes along two edges of the upper portion with pin holes of a first form of said two forms placed on the upper portion;

a first side edge alignment tab and a second side edge alignment tab, said first side edge alignment tab formed from a first cut extending inwardly approximately one inch from a left side edge having a second cut made perpendicular from the innermost edge of the first cut approximately ½ inch to and through said alignment/fold line, said second side edge alignment tab formed from a first cut extending inwardly approximately one inch from a right side edge having a second cut made perpendicular from the innermost edge of the first cut for approximately ½ inch to and through said alignment/fold line;

a center alignment tab formed on the lower portion from two cuts of approximately ½ inch in length perpendicular to and through said alignment/fold line, said cuts approximately 2 inches apart connected by a third cut parallel to said alignment/fold line;

means for separating said sheet into equal halves for alignment of pin holes on any size form; and a first substantially continuous strip of adhesive formed across the upper portion and the lower portion of said sheet and a second substantially continuous strip of adhesive formed across the upper portion and the lower portion of said sheet, for maintaining said pin holes of said two forms in alignment with said pin holes of said sheet.

* * * * *